Oct. 29, 1968 P. SCHLADERMUNDT 3,407,524
COMPONENT MATCHING SYSTEM
Filed March 4, 1966 2 Sheets-Sheet 1

INVENTOR.
PETER SCHLADERMUNDT and
BY WILLIAM H. DENNERLEIN

*Lockwood, Woodard, Smith & Weikart*
Attorneys

Oct. 29, 1968  P. SCHLADERMUNDT ET AL  3,407,524
COMPONENT MATCHING SYSTEM
Filed March 4, 1966  2 Sheets-Sheet 2

INVENTOR.
PETER SCHLADERMUNDT &
WILLIAM H. DENNERLEIN

Lockwood, Woodard, Smith & Weikart
Attorneys

United States Patent Office 3,407,524
Patented Oct. 29, 1968

3,407,524
COMPONENT MATCHING SYSTEM
Peter Schladermundt, Bronxville, and William H. Dennerlein, Bethpage, N.Y., assignors to Bliss & Laughlin Industries, Incorporated, Oak Brook, Ill., a corporation of Illinois
Filed Mar. 4, 1966, Ser. No. 531,946
1 Claim. (Cl. 40—2)

This invention relates generally to systems for properly matching various heterogeneous components of a composite assembly and in particular to a system for conveniently keying various furniture hardware elements to each other when the elements are individually packaged and displayed for sale.

Carpentry and cabinetmaking have modernly become hobbies or avocations which are widespread and expenditures for materials and supplies are substantial. Home workshop hobbyists place particular value in fabricating cabinetry or similar projects which are to some extent unique and differ from the production line furniture or cabinets available at retail in finished or unfinished form. The commercial remodeling or modernizing of old homes and customizing of existing cabinetry and built-in facilities also provide a demand for unique components such as cabinet hardware. Meeting this need with respect to cabinet hardware at the supermarket or large hardware store level, for example, requires maintaining readily available for self-service a display rack carrying a wide choice of backplates, bails, knobs and the like of various stylistic configurations. Considerable creative effort can be expended by the manufacturer of such hardware in producing integrated lines of components such as backplates, knobs, etc., the components of any one line aesthetically matching in appearance the other components in the line. The lines can be integrated to the extent that, for example, a particular backplate design might accommodate or be aesthetically acceptable with two or more knobs or bails of related lines. Such an arrangement permits the purchaser to make a choice of several knobs, for example, which will be aesthetically acceptable with a particular backplate which he has chosen. While some choice among the various hardware components is an inducement to purchase, the individual packaging of the components required for this type of merchandising makes it difficult to properly match or key various lines of components to each other. It is difficult for the purchaser to select from the display rack one of the two or three choices of bails, for example, which can be aesthetically accommodated to, or which are even capable of being mechanically assembled with, the backplate he has chosen.

It is the primary object of the present invention to provide a system, utilizing visually keyed display and mounting devices, for conveniently matching heterogeneous components of a composite assembly or grouping of elements such as cabinet hardware.

It is a further object of the present invention to provide a series of display and mounting cards, for items such as cabinet hardware, which have interfitting marginal configurations indicating the compatibility, either aesthetically or mechanically, of the components mounted on the various cards.

These and other objects will become apparent as the description proceeds with reference to the accompanying drawings in which.

Figure 1:
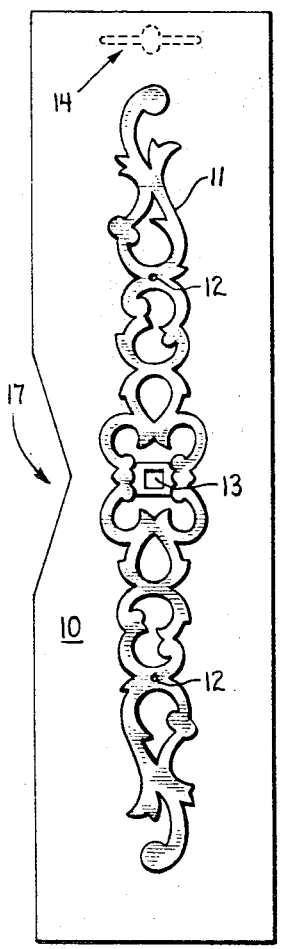
FIG. 1 is a plan view of a display card embodying the present invention and having a cabinet hardware backplate mounted thereon.

Referring initially to FIGS. 1 through 8, the display card 10 of FIG. 1 mounts a backplate 11 having mounting apertures 12 and a central, generally rectangular aperture 13 adapted to receive the pin portion of an appropriate bail. The backplate 10 may be mounted on the card by any suitable means such as by a flexible, transparent plastic membrane adhered to the card face and referred to in the trade as a "skin pack," or by means of a transparent, semirigid cover adhered to the card face and referred to in the trade as a "blister pack." The card 10, and all of the other cards shown in FIGS. 2 through 8 may be provided with a suitable die cut hole indicated in broken lines at 14, the aperture having the characteristic "coat hanger" shape which aids in suspending the cards on mounting pins. One margin of the card 10 is cut away along two intersecting inclined lines to produce a triangularly shaped cutout portion indicated generally at 17.

Figure 2:
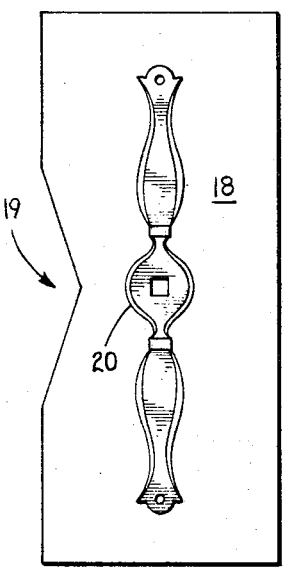
FIG. 2 is a plan view of a display card similar to FIG. 1 but mounting a different backplate.
Figure 3:
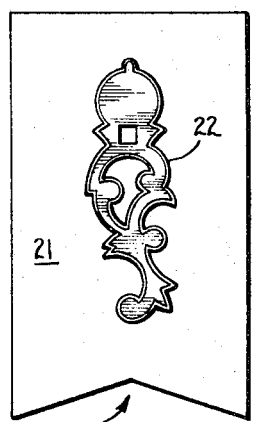
FIG. 3 is a plan view of a display card further embodying the present invention and mounting a backplate.
Figure 5:
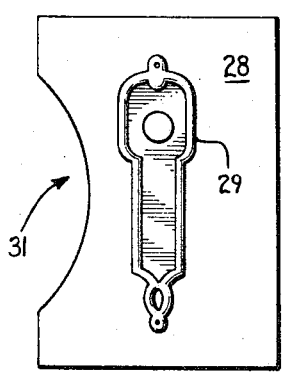
FIG. 5 is a further display card embodying the present invention and mounting a backplate.
Figure 10:
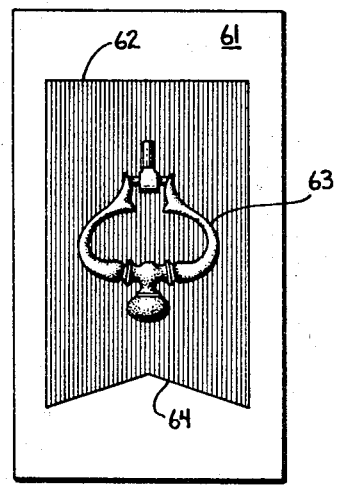
FIG. 10 is a display card mounting a cabinet hardware component which embodies a modified form of the present invention.

The display card 18 shown in FIG. 2 is similar to card 10 in that it is provided with a triangular cut-away portion 19 and differs from the card of FIG. 10 in its vertical dimension. The card 18 mounts a somewhat shorter, less elaborate backing plate 20. FIG. 3 discloses a display card 21 carrying a backplate 22 and having a generally triangular cut-away portion 23 along its lower margin.

Figure 4:
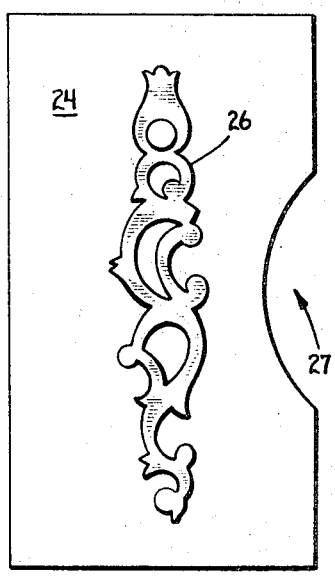
FIG. 4 is a plan view of a display card mounting a backplate similar to those shown in the preceding figures.

The card 24, shown in FIG. 4, mounts a backplate 26 and one of its margins is provided with a semi-circular, rather than triangular, cut-away portion indicated generally at 27. The card 28, shown in FIG. 5, mounts a backplate 29 and is also provided with a generally circular cut-away portion 31.

Figure 6:
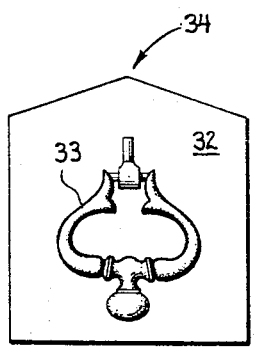
FIG. 6 is a plan view of an additional display card mounting a cabinet hardware bail.
Figure 7:
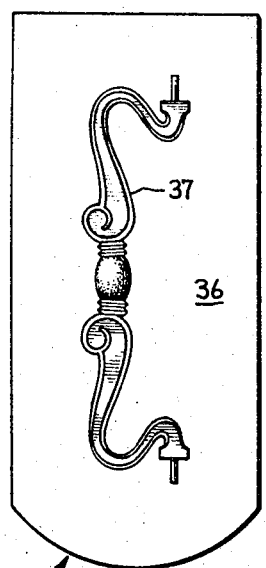
FIG. 7 is a plan view of a further display card mounting a bail.
Figure 8:
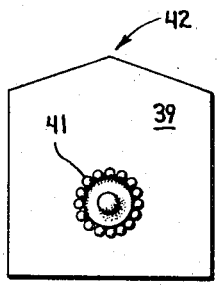
FIG. 8 is a plan view of a display card mounting a cabinet hardware knob.

FIG. 6 discloses a card 32 mounting a bail 33. The upper margin of the card 32 is formed to a peaked configuration indicated generally at 34 and, it will be noted, the dimension of the peaked configuration matches the dimensions of the cut-out portions 17, 19 and 23 of FIGS. 1, 2 and 3. The card 36 of FIG. 7 mounts an additional bail 37 and the lower margin of the card is formed in a semi-circular or arcuate configuration indicated generally at 38. It will be noted that the radius of the curved margin 38 of the card 36 is such as to cause this curved margin to match or interfit with the curved margins 27 and 31 of the cards 24 and 28 shown in FIGS. 4 and 5. The card 39, shown in FIG. 8, carries a knob 41 and the margin of the card is provided with a peaked configuration, indicated at 42 which is similar to the peaked margin 34 of the card 32 shown in FIG. 6.

Figure 9:
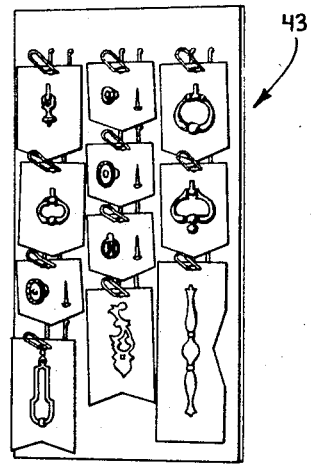
FIG. 9 is a perspective view of a display stand carrying the display cards embodying the present invention.

In use, with the display cards carried by a rack, such as that shown at 43 in FIG. 9, if the purchaser should select the backplate carried by card 10 (FIG. 1), he removes this card from the rack and, to provide it with a compatible bail component, he selects from the rack a bail-carrying card, such as card 32 of FIG. 6, whose margin may be interfitted or matched with the triangularly shaped cut-out portion 17 of the card 10. The interfitting of the peaked margin 34 of the card 32 in the triangular cut-out portion 17 of the card 10 indicates to the purchaser that the bail 33 is compatible both aesthetically and mechanically with the backplate 11 carried by the card 10. Similarly, if the backplate 26 is chosen, the matching of the arcuate margin 38 of the card 36 with the arcuate cut-out portion 27 of the card 24 indicates that the bail 37 is compatible with the backplate 26. It will be understood that various selections of components may thus be keyed or matched to each other by matching the marginal areas of the display cards carrying the components.

Figure 11:
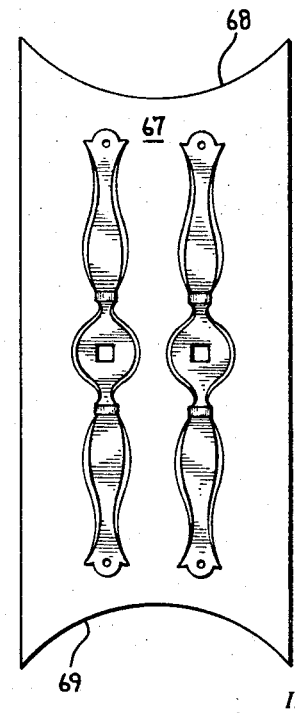
FIG. 11 is a plan view of a display card embodying a further modified form of the present invention.

In FIG. 10 there is disclosed a modified form of the invention in which the display card 61 is provided with a central colored area 62 upon which is mounted a bail 63 or other cabinet hardware component. The card 61 differs from those previously described in that its marginal edges are straight, however, the colored area 62 is provided with a shaped margin 64 which can be matched with similarly shaped colored area margins on other display cards. The matching of the components is thus accomplished graphically rather than by interfitting the marginal areas of the display cards. The display card 67 of FIG. 11 differs from those previously described in that it has two margins 68 and 69 which are arcuately formed or otherwise configured so as to interfit with other display cards. The distinctive profiling of two margins of the display card can be utilized to indicate that two matching components are necessary for assembly with the components carried by the card 67.

While the system of the present invention has been described as being used in matching various heterogeneous components of cabinet hardware, it will be understood that the same display card matching system might be utilized for keying any other components of a composite assembly in a convenient fashion quite suitable for modern, self-service merchandising.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. A display grouping of furniture hardware items or the like, said grouping including a plurality of display cards each having an item mounted on one face and having a distinctive contour variation in at least one of its marginal edges shaped to interfit with the edge contour variation of other display cards carrying compatible items, whereby compatible items of said grouping may be conveniently gathered by matching the interfitting marginal surfaces of the cards.

References Cited

UNITED STATES PATENTS

| 1,332,421 | 3/1920 | Bogardus | 40—2 |
| 1,428,456 | 9/1922 | Stranders | 35—73 |
| 1,735,456 | 11/1929 | Garman | 35—73 |
| 2,096,153 | 10/1937 | Weiss. | |

EUGENE R. CAPOZIO, *Primary Examiner.*

W. J. CONTRERAS, *Assistant Examiner.*